United States Patent [19]

Scorsiroli

[11] Patent Number: 5,245,742

[45] Date of Patent: Sep. 21, 1993

[54] METHOD FOR MANUFACTURING A WINDSCREEN-WIPER BLADE OF UNITARY STRUCTURE

[75] Inventor: Marcello Scorsiroli, Turin, Italy

[73] Assignee: Cooper Industries, Inc., Houston, Tex.

[21] Appl. No.: 896,745

[22] Filed: Jun. 9, 1992

Related U.S. Application Data

[62] Division of Ser. No. 764,642, Sep. 24, 1991, abandoned.

[30] Foreign Application Priority Data

Sep. 24, 1990 [IT] Italy ............................... 67709 A/90

[51] Int. Cl.⁵ ............................................. B23P 11/02
[52] U.S. Cl. ....................................... 29/451; 29/527.1
[58] Field of Search ..................... 19/450, 451, 527.1; 15/250.41, 250.42, 250.36

[56] References Cited

U.S. PATENT DOCUMENTS

| 3,176,337 | 4/1965 | Glynn | 15/250.42 |
| 3,234,578 | 2/1966 | Golub et al. | 15/250.42 |
| 3,969,784 | 7/1976 | Journee | 15/250.42 |
| 4,028,770 | 6/1977 | Appel | 15/250.42 |
| 4,102,003 | 7/1978 | Hanca | 15/250.42 |
| 4,930,180 | 6/1990 | Longman | 15/250.42 |

FOREIGN PATENT DOCUMENTS

| 0232598 | 8/1987 | European Pat. Off. | 15/250.41 |
| 2319148 | 10/1973 | Fed. Rep. of Germany | 15/250.42 |
| 1520385 | 3/1968 | France | 15/250.42 |
| 1078066 | 8/1967 | United Kingdom . | |

Primary Examiner—Timothy V. Eley
Attorney, Agent, or Firm—William B. Patterson; Eddie E. Scott; Alan R. Thiele

[57] ABSTRACT

A windscreen-wiper blade includes a moulded plastics holder constituted by a main bow with a central portion for the attachment of an operating arm and at least two secondary bows formed in a single piece with the main bow, and a wiper blade carried by a longitudinal support which is inserted between pairs of lateral retaining claws on the main and secondary bows. The main bow has two transverse centering and stop projections at its ends for preventing the support with its wiper blade from coming out of the holder longitudinally.

2 Claims, 2 Drawing Sheets

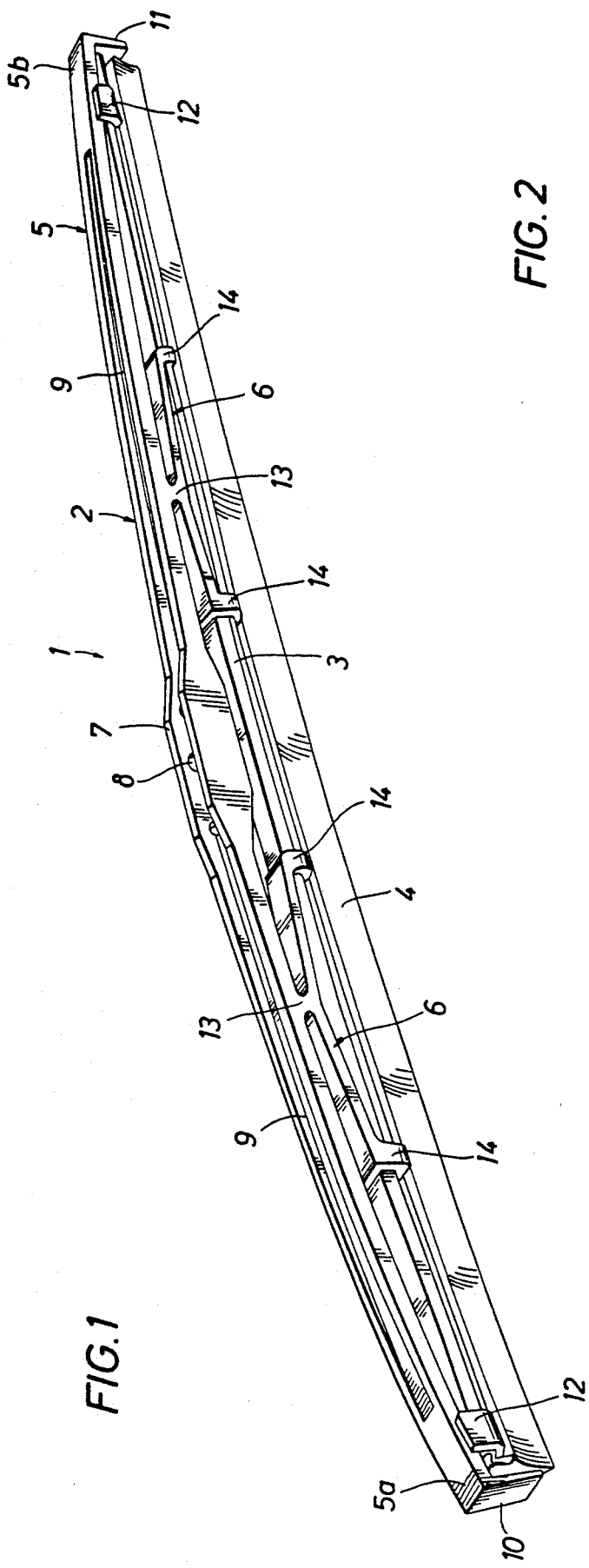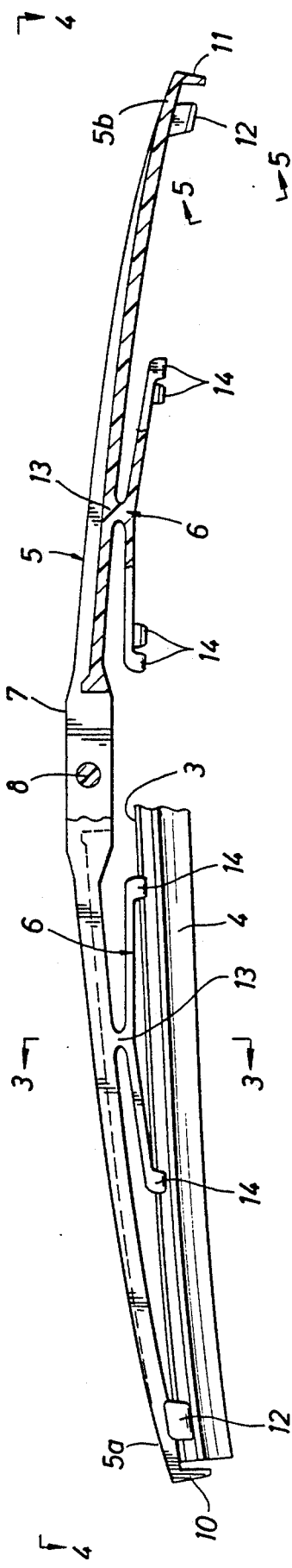

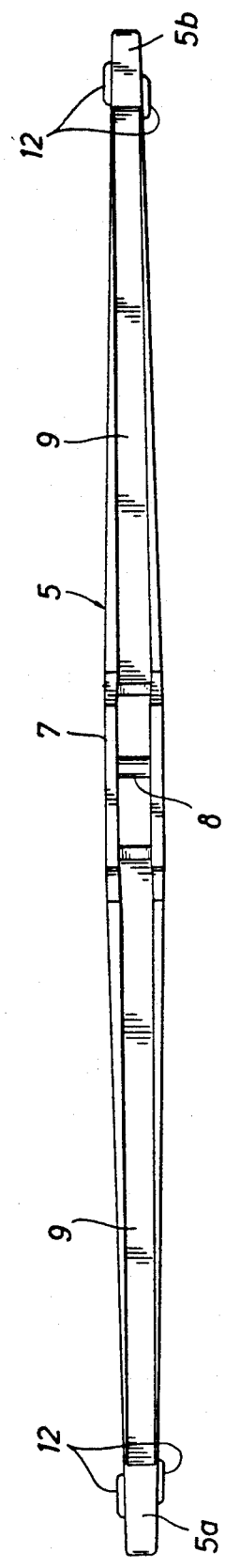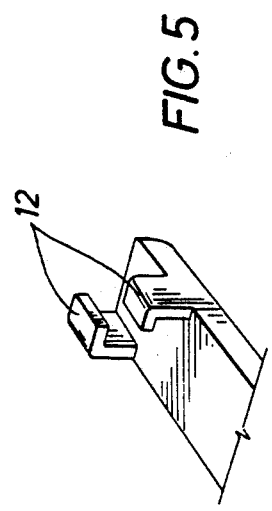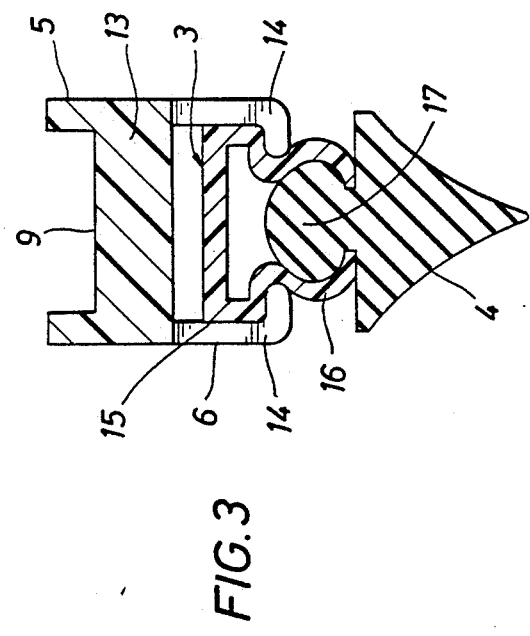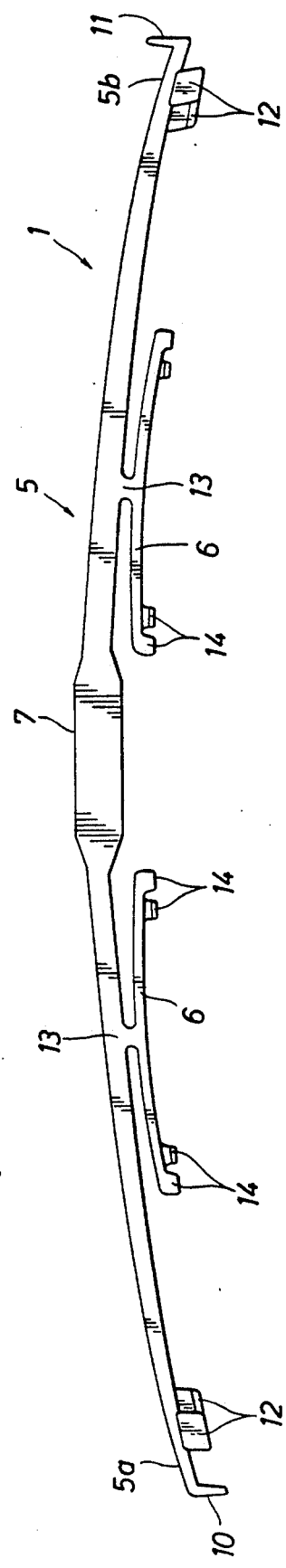

METHOD FOR MANUFACTURING A WINDSCREEN-WIPER BLADE OF UNITARY STRUCTURE

This is a divisional of copending application Ser. No. 07/764,642 filed on Sep. 24, 1991, now abandoned.

BACKGROUND OF THE INVENTION

The present invention relates to windscreen-wiper blades for motor vehicles and similar applications, of the type comprising a holder of moulded plastics material constituted by a main bow whose convex side has a central portion for attachment to an operating arm and whose concave side carries at least two secondary bows, and a wiper blade of elastomeric material carried by a longitudinal support which is inserted between pairs of lateral retaining claws on the main bow and the secondary bows.

More particularly, the invention relates to a windscreen-wiper blade of the type defined above, in which the secondary bows are formed in a single piece with the main bow.

A windscreen-wiper blade of this type is known from GB-B-1078066, according to which the support for the wiper blade is free to slide longitudinally through the retaining claws. This freedom to slide is necessary to allow the blade holder to bend resiliently in order to adapt itself to the shape of the surface to be wiped but involves the risk of the support and the wiper blade accidentally coming out of the blade holder, or at least being displaced from their correct central position therein.

The object of the present invention is to avoid this problem and to provide a windscreen-wiper blade of the type defined above which is formed so as to ensure that the support and the wiper blade are centered correctly in the blade holder.

A further object of the invention is to prevent the support and the wiper blade from accidently coming out of the blade holder longitudinally.

A further object of the invention is to provide a windscreen-wiper blade of the type defined whose blade holder can easily be manufactured as a unit by a single moulding operation and which also enables the support with its wiper blade to be fitted in a fully automated manner without manual intervention.

The windscreen-wiper blade according to the invention is characterised mainly in that the main bow of the blade holder has two integral transverse centering and stop projections which project from its ends on the same side as the secondary bows to prevent the the support of the wiper blade from coming out of the blade holder longitudinally.

According to another aspect of the invention, the attachment portion of the main bow of the blade holder includes a transverse fixing pin integral with the main bow.

To advantage, the pairs of lateral retaining claws are also integral with the main bow and the secondary bows respectively, the claws of each pair being offset from each other longitudinally. This arrangement simplifies the moulding of the blade holder.

According to another aspect of the invention, at least for most of its length, the main bow has a channel-shaped cross-section whose cavity is on the convex side of the bow. This configuration affords the blade holder good resistance to the torsional forces to which the blade is subject in use.

A further subject of the invention is a method of manufacturing the windscreen-wiper blade defined above which enables the fully automated assembly of the support with its wiper blade and the holder.

The method comprises the following steps:

moulding the main bow together with the secondary bows, the fixing pin, the retaining claws and the transverse centering and stop projection at one end of the main bow from a thermoplastics material, the transverse stop projection at the other end of the main bow being moulded so as to project from the side opposite the secondary bows, providing and interconnecting the longitudinal support and the wiper blade, inserting the longitudinal support between the lateral claws from the said other end of the main bow, shifting the other stop projection so that it projects from the same side as the secondary bows.

Conveniently, the other stop projection is transferred ultrasonically.

BRIEF DESCRIPTION OF THE DRAWINGS

FIG. 1 is a schematic perspective view of a windscreen-wiper blade according to the invention, FIG. 2 is a partially interrupted, partially longitudinally sectioned view of FIG. 1, FIG. 3 is a cross-section taken on the line III—III of FIG. 2 on an enlarged scale, FIG. 4 is a plan view taken on the arrow IV of FIG. 2, FIG. 5 shows in perspective the detail indicated by the arrow V in FIG. 2 on an enlarged scale and upside down, and FIG. 6 is a side elevational view of the holder shown in a temporary intermediate configuration during the manufacture of the blade unit.

DETAILED DESCRIPTION OF A PREFERRED EMBODIMENT

With reference initially to FIGS. 1, 2 and 4, a windscreen-wiper blade for motor vehicles and similar applications, generally indicated 1, is constituted by only three parts:

a one-piece holder 2 of moulded plastics material,
a longitudinal support 3, also of plastics material, and
a wiper blade 4 of elastomeric material.

The holder 2 includes, in a single piece, a main bow 5 and two secondary bows or compensators 6 having two support points and projecting from the concave side of the main bow 5.

The main bow 5 has a central attachment portion 7 including an integral transverse pin 8 for connection, normally by a connector, not shown, to an operating arm. The longitudinal regions of the main bow 5 between its attachment portion 7 and its ends 5a, 5b have channel-shaped cross-sections 9, whose cavities are in the convex side of the bow. This shape affords the main bow 5, and hence the entire holder 2, good torsional rigidity.

The ends 5a, 5b of the main bow 5 have respective end regions which project from its concave side and form two integral centering and stop projections 10 and 11, whose function will be explained below.

The concave side of the main bow 5 also has two pairs of lateral retaining claws 12 near its ends 5a, 5b. As can better be seen in FIG. 6, the two claws 12 of each pair are offset from each other longitudinally of the blade unit 1.

The two secondary bows 6, as stated, are formed in a single piece with the main bow 5 on the concave side thereof and are connected thereto by respective bridges 13. Each secondary bow 6 has respective pairs of lateral retaining claws 14 at its ends and, as shown in greater detail in FIG. 5, these are also offset from each other longitudinally of the blade unit 1.

With reference in greater detail to FIG. 3, the longitudinal support 3 is constituted by an elongate body normally produced by extrusion, including a base portion 15 which is engaged between the claws 12 of the main bow 5 and the claws 14 of the secondary bows 6, and a hollow retaining portion 16 which projects below the claws 12 and 14. The retaining portion 16 has a rounded cross-section and houses a base portion 17 of complementary shape integral with the wiper blade 4. The blade 4 is also normally produced by extrusion.

In the assembled condition of the windscreen-wiper blade 1 shown in FIGS. 1, 2 and 4, the support 3 with its wiper blade 4 is inserted in the manner described above between the claws 12 and 14 so that its ends, and hence the corresponding ends of the wiper blade 4, face the centering and stop projections 10, 11 a short distance therefrom. This allows limited longitudinal sliding of the support 3-wiper blade 4 assembly relative to the holder 2 and, at the same time, ensures their correct relative positioning. The projections 10, 11, however, prevent the support 3-wiper blade 4 assembly from becoming disengaged longitudinally from the retaining claws 12, 14 of the holder 2.

According to the invention, the windscreen-wiper blade 1 is produced in a fully automated and automatic manner by a C.I.M. (COMPUTER INTEGRATED MANUFACTURING) method, that is, without the need for human intervention.

This method provides for the production, in a first stage, of the holder 2 on the one hand and of the support 3 and the wiper blade 4 on the other hand.

The holder 2 is produced by a single step in which a thermoplastics material is moulded in a die, for example, by injection, so as to form the holder in its initial temporary configuration indicated 2a in FIG. 6. In this configuration, the holder includes, in a single piece, the main bow 5 with its attachment portion 7 and its retaining claws 12, the secondary bows 6 with their retaining claws 14, and the centering and stop projection 10.

The other centering and stop projection 11, however, is moulded, temporarily, on the side opposite the projection 10, that is, it projects from the convex side of the main bow 5.

The support 3 and the wiper blade 4 are formed in turn by the extrusion of a thermoplastics material and an elastomeric material respectively, and are then assembled by the insertion of the base portion 17 in the retaining portion 16.

The support 3-wiper blade 4 assembly and the holder 2 are then assembled by the insertion and sliding of the base portion 15 between the claws 12 and 14 from the end 5b of the main bow 5 which corresponds to the projection 11.

After the support 3-wiper blade 4 assembly has reached its correct central position in the holder 2, the last step of the method, which consists of the changing of the projection 11 from its temporary position of Figure to its final position of FIGS. 1, 2 and 4, is carried out.

This step is effected by the ultrasonic transfer of the thermoplastics material constituting the projection 11 from the convex side of the main bow 5 to the concave side.

In use, the shape of the holder 2 and, in particular, the arrangement of the two secondary bows 6 enable the pressure imparted by the operating arm to be distributed uniformly along the wiper blade 4. The projections 10 and 11 keep the wiper blade 4 in its correct central position in the holder 2 whilst allowing small longitudinal relative displacements due to any variations in the curvature of the holder 2 as it adapts itself to the surface to the wiped but preventing the support 3-wiper blade 4 assembly from accidentally coming out of the holder 2.

Naturally, the principle of the invention remaining the same, the details of construction and forms of embodiment may be varied widely with respect to those described and illustrated, without thereby departing from the scope of the present invention.

What is claimed is:

1. A method of manufacturing a windscreen wiper blade, said method comprising the following steps:
    molding a structure out of a thermoplastic material, said structure including:
        a main bow with a plurality of retaining claws and an attachment portion;
        one or more secondary bows having a plurality of retaining claws; a first centering and stop projection at a first end of said main bow; and
        a second centering and stop projection at a second end of said main bow and extending in a direction opposite said first centering and stop projection;
    providing a wiper blade and support;
    inserting said wiper blade and said support between said claws from said second end of said main bow; and
    shifting said second centering and stop projection so that it projects from the same side of said main bow as said secondary bows.

2. The method in claim 1, whereby said second centering and stop projection is shifted by ultrasonic transfer.

* * * * *